United States Patent

[11] 3,612,098

| [72] | Inventors | Ronald E. Bora<br>Torrance;<br>Charles R. Clark, Redondo Beach; Larry C. Mittell, Palos Verdes Estates, all of Calif. |
|---|---|---|
| [21] | Appl. No. | 829,985 |
| [22] | Filed | June 3, 1969 |
| [45] | Patented | Oct. 12, 1971 |
| [73] | Assignee | Parker-Hannifin Corporation<br>Cleveland, Ohio |

[54] LIGHTWEIGHT VALVE ASSEMBLY
10 Claims, 5 Drawing Figs.

[52] U.S. Cl. .................................................. 137/527,
 137/540.11, 137/542
[51] Int. Cl. ........................................................ F16k 15/03,
 F16k 15/06
[50] Field of Search ........................................... 137/315,
 316, 525.5, 527, 527.4, 527.8, 535, 540.11;
 251/298, 303

[56] References Cited
UNITED STATES PATENTS

| 2,888,036 | 5/1959 | Reppert | 137/527.8 X |
|---|---|---|---|
| 2,925,825 | 2/1960 | Staiger | 137/527.4 X |
| 3,112,758 | 12/1963 | Norton | 137/315 |
| 3,292,653 | 12/1966 | Scaramucci | 137/315 |
| 3,295,547 | 1/1967 | Scaramucci | 137/527.8 X |

*Primary Examiner*—M. Cary Nelson
*Assistant Examiner*—David R. Matthews
*Attorney*—Diller, Brown, Ramik & Holt

ABSTRACT: This disclosure relates to a valve assembly for use in aircraft. The assembly includes a main body secured to an adapter and a check valve disposed within the body and mounted on the adapter. The body and as much of the adapter as possible are constructed of very thin material relative to thicker coupling portions of the adapter whereby the valve assembly is of an extremely lightweight construction.

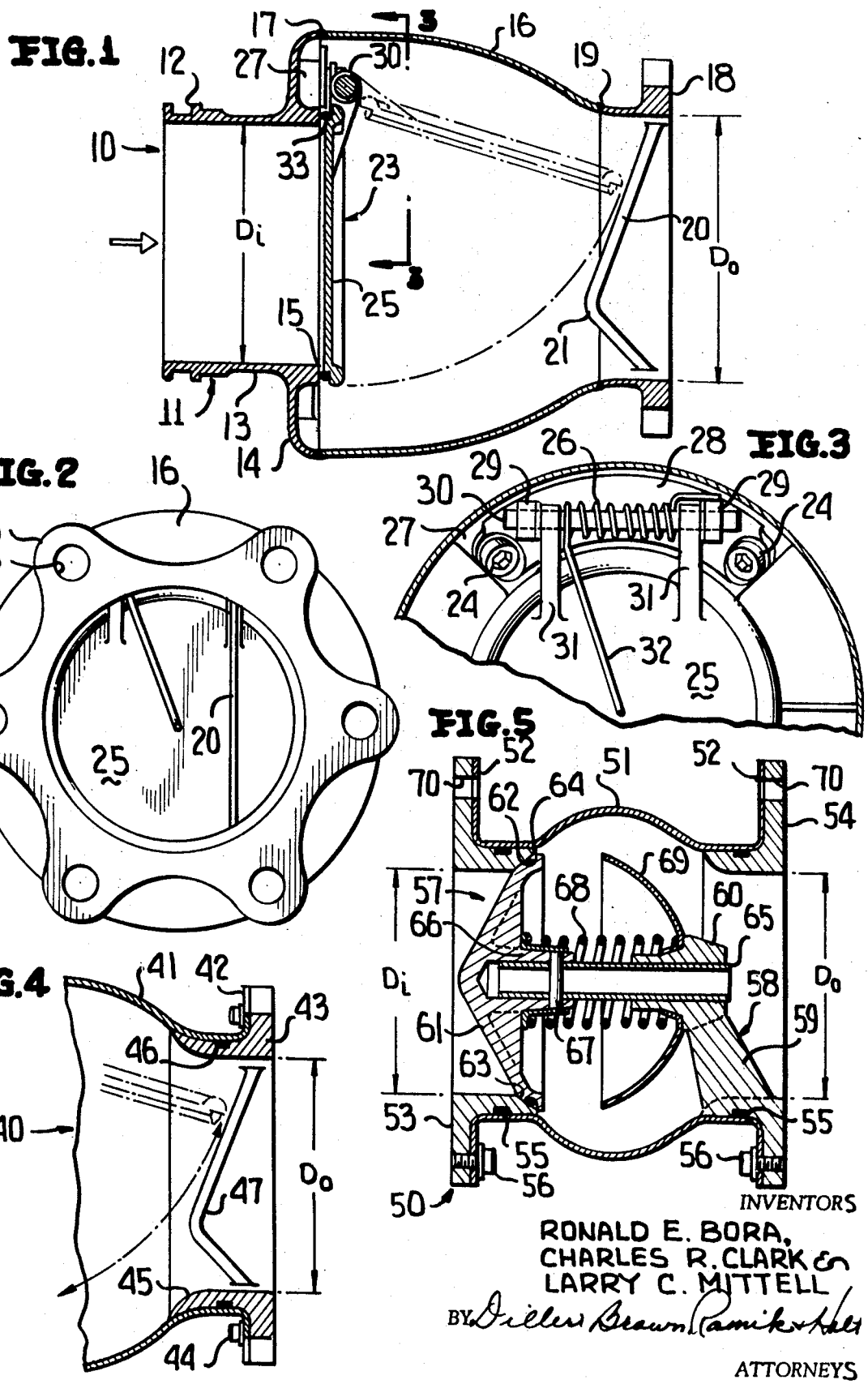

LIGHTWEIGHT VALVE ASSEMBLY

This invention relates specifically to valve assemblies for use in aircraft.

A prime consideration in the construction of aircraft parts is lightness of weight. Heretofore, valve assemblies for use in aircraft have generally been cast or otherwise of a relatively heavy construction although formed of lightweight materials. It is, therefore, an object of this invention to construct a multipart valve assembly utilizing relatively lightweight elements whenever possible.

In order to accomplish the foregoing, it is necessary to provide separately formed parts constructed as thin as possible commensurate with the stress and fluid pressures that they must be capable of withstanding, and then fabricate the valve assembly by welding or other suitable means. However, certain internal parts of the valve assembly that are incapable of withstanding the welding heat cannot be inserted into the valve assembly until the external parts are welded together. It is, therefore, a further object of this invention to provide a valve assembly having features of construction which permit internal parts thereof to be inserted through the outlet opening of the valve assembly and mounted therein after external parts have been assembled.

More particularly, it is an object of this invention to provide an adapter at the outlet of the valve assembly that has an opening of a size sufficient through which internal parts may be inserted, and wherein a guard web carried by the adapter is offset to permit insertion of the internal parts therepast.

With the above and other objects in view that will hereinafter appear, the nature of the invention will be more clearly understood by reference to the following detailed description, the appended claimed subject matter and the several views illustrated in the accompanying drawing.

IN THE DRAWING

FIG. 1 is a longitudinal sectional view taken through the valve assembly.

FIG. 2 is an end view of the outlet end of the valve assembly.

FIG. 3 is a fragmentary vertical sectional view along line 3—3 of FIG. 1 showing the mounting of the check valve.

FIG. 4 is a fragmentary vertical sectional view taken through the outlet end of another embodiment of the valve assembly.

FIG. 5 is a longitudinal sectional view of yet another embodiment of valve assembly.

Valve assembly 10 of FIG. 1 includes adapter 11 at its inlet end having suitable means 12 formed thereon for coupling valve assembly 10 to a fuel line. Adapter 11 further includes a relatively thin central portion 13 and flange 14. Annular rim 15 extends from flange 14 and the end thereof serves as a valve seat. Rim 15 and coupling means 12 are heavier than the other portions of adapter 11 which do not provide coupling or support functions.

Body 16, which may be of spun metal or otherwise formed as thin as possible commensurate with the internal pressures it must withstand, is welded at 17 to adapter 13. Downstream mounting adapter 18 is similarly welded at 19 to the outlet end of body 16. Adapter 18 carries guard web 20 having a hump portion 21. Adapter 18 has bores 22 through which coupling bolts may be inserted to mount valve assembly 10.

Check valve 23 is mounted on adapter 11 by means of suitable fasteners 24 (FIG. 3) and includes clapper plate 25 which is biased towards a closed position against the end of rim 15 by means of spring 26. The check valve 23 is mounted on pad 27 by means of bracket 28. Bracket 28, which is secured to pad 27 by fasteners 24, carries ears 29 in which pin 30 is supported. Lugs 31 extend from clapper plate 25 and are suitably journaled on pin 30. Spring 26, which includes force-applying portion 32, is also carried by pin 30. Sealing ring 33 (FIG. 1) is disposed about the periphery of plate 25 and assures a positive seal against the end of valve seat rim 15.

Check valve 23, particularly sealing ring 33, being incapable of withstanding the welding heat, it is incumbent that welding be effected prior to insertion of check valve 23 in body 16. Thus web 20 (FIG. 2) is disposed off center. Check valve 23 may be inserted past web 20 and through the opening in adapter 18 into the interior of valve assembly 10 for mounting on adapter 11. Outlet diameter $D_o$ is thus made large enough for check valve 23 to be passed therethrough while corresponding as closely as possible with inlet diameter $D_i$ to maintain desirable flow characteristics. To facilitate this post-assembly mounting, fasteners 24 are inclined at a compound angle (FIG. 3) to accommodate a tool inserted through the outlet opening.

In the event that check valve 23 should become disengaged during operation, it will be prevented by web 20 from blocking the flow passage with hump 21 causing check valve 23 to assume a skewed position. In normal operation the positioning of web 20 is such that clearance is provided for check valve 23 to pivot between its opened and closed positions.

A modified valve assembly 40 is illustrated in FIG. 4. Valve assembly 40 includes body 41 that is similar to body 16 except that it includes a radially outwardly flaring portion 42 at its outlet end. Mounting adapter 43, instead of being welded to body 41 as mounting adapter 18 is welded to body 16, is temporarily secured thereto by fasteners 44. Valve assembly 40 is mounted in place by coupling bolts in the same manner as valve assembly 10.

Adapter 43 includes upstream portion 45 which is contoured to provide a smooth streamline continuation of body 41. O-ring 46 is positioned between upstream portion 46 and body 41 to provide a fluid-tight seal therebetween.

Adapter 43 further includes web 47 which serves the same function as web 20. However, inasmuch as the check valve may be mounted in body 41 prior to fastening adapter 43 on body 41, web 47 need not be offset as in valve assembly 10. Also for this reason, outlet diameter $D_o$ may correspond to that of the inlet opening.

Valve assembly 50 of FIG. 5 includes body 51 which is formed as thin as possible commensurate with internal pressures that it must withstand. Body 51 is formed symmetrical with radial flanges 52 at both its inlet and outlet ends. Valve assembly 50 further includes adapters 53 and 54 at its inlet and outlet ends, respectively, with suitable O-ring seals 55 provided at each end. The diameter $D_o$ of the outlet opening corresponds to the diameter $D_i$ of the inlet opening. Temporary shipping fasteners 56 secure adapters 53 and 54 to the respective flanges 52.

Check valve 57 is mounted within body 51 by means of spider 58 carried by adapter 54. Spider 58 includes vanes 59 and guide 60. Check valve 57 includes valve head 61 having valve face 62 which seats against seat 63 formed as part of adapter 53. O-ring 64 is set in a groove in face 62 to insure a fluid-tight seal.

Valve stem 65 is received in hub 66 of valve head 61 and is positively secured thereto by pin 67. At its other end stem 65 is slidingly received in guide 60. Spring 68 extends between guide 60 and hub 66 and biases valve head 61 toward the closed position. Retainer spring 69 serves as a support for valve head 61 in its open position and in cooperation therewith provides a smooth continuous surface facilitating streamlined flow. Bores 70 are provided in adapters 53 and 54 and the respective flanges 52 through which coupling bolts may be inserted to mount valve assembly 50.

The construction of valve assembly 50, particularly the size of the openings in body 51, permits insertion of check valve 57 in body 51 from either the inlet or outlet end prior to the mounting of the respective adapter 53 or 54, thus facilitating assembly or maintenance of parts while valve assembly 50 is mounted in place.

From the foregoing, it will be readily apparent that there is provided in accordance with this invention a novel valve assembly that because of its lightweight construction is particularly suited for use in aircraft. The novel features of construction permitting the check valve member to be inserted after the external parts are assembled permits utilization of a relatively thin-walled body which may be separately formed and either welded or otherwise secured to the other parts of the valve assembly.

Although only preferred embodiments of the invention have been specifically illustrated and described herein, it is to be understood that minor variations may be made without departing from the spirit of the invention.

I claim:

1. A lightweight check valve comprising a body having an inlet end with an inlet opening and an outlet end with an outlet opening, an inlet adapter connected to said inlet end and an outlet adapter connected to said outlet end, the material of said body being as thin as possible commensurate with internal pressures, a check valve within said body means supporting said check valve on one of said adapters, yieldable means seating said check valve against said inlet adapter, and at least one of said body openings being large enough to permit insertion of said check valve therethrough prior to attachment of the respective adapter to the body end having said one opening.

2. The valve assembly of claim 1 wherein said supporting means is on said inlet adapter.

3. The valve assembly of claim 1 wherein said supporting means is on said outlet adapter.

4. A lightweight valve assembly for aircraft comprising an inlet adapter, a separately formed body secured to said adapter, a check valve positioned within said body and seated against said adapter, and the material of said body being as thin as possible commensurate with internal pressures relative to thicker portions of said adapter, said body having an inlet and an outlet, an outlet adapter secured to said body at said outlet, a web carried by said outlet adapter extending across said outlet, and said web having a hump portion whereby said check valve upon accidental disengagement from its mounting will be prevented from blocking said outlet.

5. The valve assembly of claim 4 wherein said web is disposed off center to permit said check valve to be inserted therepast for mounting on said inlet adapter.

6. The valve assembly of claim 4 wherein said outlet adapter includes an upstream portion providing a streamlined continuation of said body.

7. The valve assembly of claim 4 wherein said body outlet includes a radially outwardly flaring portion, said outlet adapter abuts said flaring portion, and said outlet adapter is temporarily secured to said flaring portion by temporary shipping fasteners.

8. A lightweight valve assembly for aircraft comprising an inlet adapter, a separately formed body secured to said adapter, a check valve positioned within said body and seated against said adapter, and the material of said body being as thin as possible commensurate with internal pressures relative to thicker portions of said adapter, said check valve being secured to said adapter by means of at least one fastener, and said at least one fastener being disposed at a compound angle to the axis of said body to facilitate accommodation of a tool inserted through said body.

9. A lightweight valve assembly for aircraft comprising an inlet adapter, a separately formed body secured to said adapter, a check valve positioned within said body and seated against said adapter, and the material of said body being as thin as possible commensurate with internal pressures relative to thicker portions of said adapter, an adapter at an outlet end of said body, and said valve being mounted on said outlet end adapter and being seated against said inlet end adapter.

10. A lightweight valve assembly for aircraft comprising an inlet adapter, a separately formed body secured to said adapter, a check valve positioned within said body and seated against said adapter, and the material of said body being as thin as possible commensurate with internal pressures relative to thicker portions of said adapter, said body being secured to said adapter by welding and portions of said check valve being incapable of withstanding welding heat, an outlet opening and an inlet opening, said outlet opening corresponding as closely as possible to said inlet opening yet being large enough to permit insertion of said check valve therethrough for mounting in said body after said body has been welded to said adapter.